United States Patent
Tanaka

[19]

[11] Patent Number: 5,930,539
[45] Date of Patent: Jul. 27, 1999

[54] FINDER VISUAL FIELD CHANGING MECHANISM

[75] Inventor: Yasuhiko Tanaka, Omiya, Japan

[73] Assignee: Fuji Photo Optical Co., Ltd., Omiya, Japan

[21] Appl. No.: 09/047,531

[22] Filed: Mar. 25, 1998

[30] Foreign Application Priority Data

Mar. 28, 1997 [JP] Japan .................................... 9-078115

[51] Int. Cl.[6] .................................................. G03B 13/10
[52] U.S. Cl. ........................................ 396/378; 396/380
[58] Field of Search ..................... 396/378, 380

[56] References Cited

U.S. PATENT DOCUMENTS 5,587,755  12/1996  Wilson et al. ........................ 396/380
5,592,252   1/1997  Kobayashi et al. ................... 396/380
5,652,932   7/1997  Kobayashi et al. ................... 396/378

FOREIGN PATENT DOCUMENTS 6-82882   3/1994   Japan .

*Primary Examiner*—W. B. Perkey
*Attorney, Agent, or Firm*—Sixbey, Friedman, Leedom & Ferguson; David S. Safran

[57] ABSTRACT

A movable visual field frame (a CP visual field frame) is arranged behind an H visual field frame, which determines a visual field corresponding to a high-vision (H) angle of view. The CP visual field frame comprises a pair of substantially L-shaped movable visual field frame pieces, which are arranged in such a manner as to face each other. First and second driving members are provided in such a manner as to rotate about a finder optical axis, and they drive the pair of the movable visual field frame pieces. A driving shaft is rotated in association with a switching control, and the first and second driving members are rotated by the driving shaft on different rotational ratios with driving gears. The second driving member rotates by a larger rotational angle than the first driving member, and regulates the positions of the movable visual field frame pieces so that upper and lower sides of the CP visual field frame can be horizontal.

4 Claims, 8 Drawing Sheets

F I G. 1
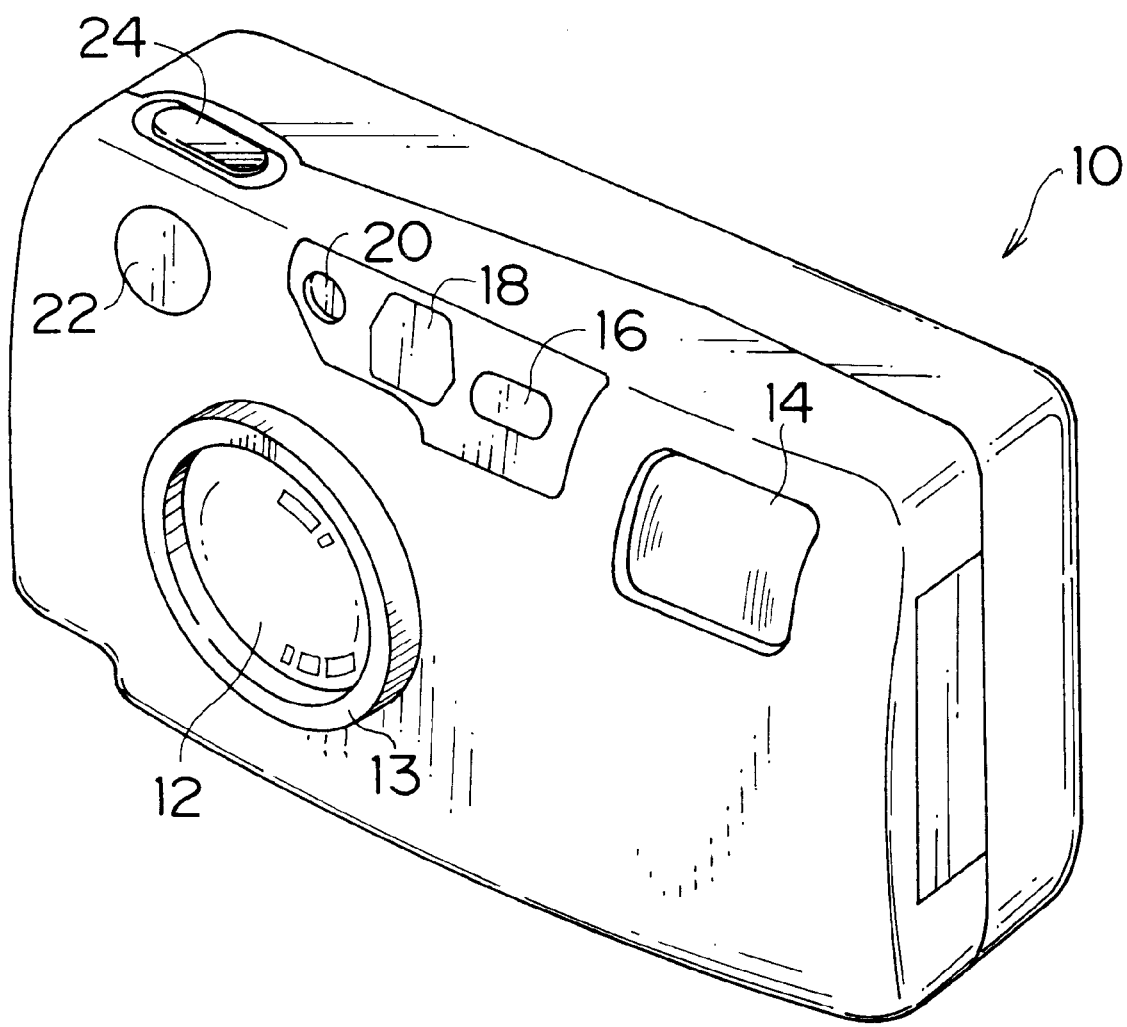

F I G. 6
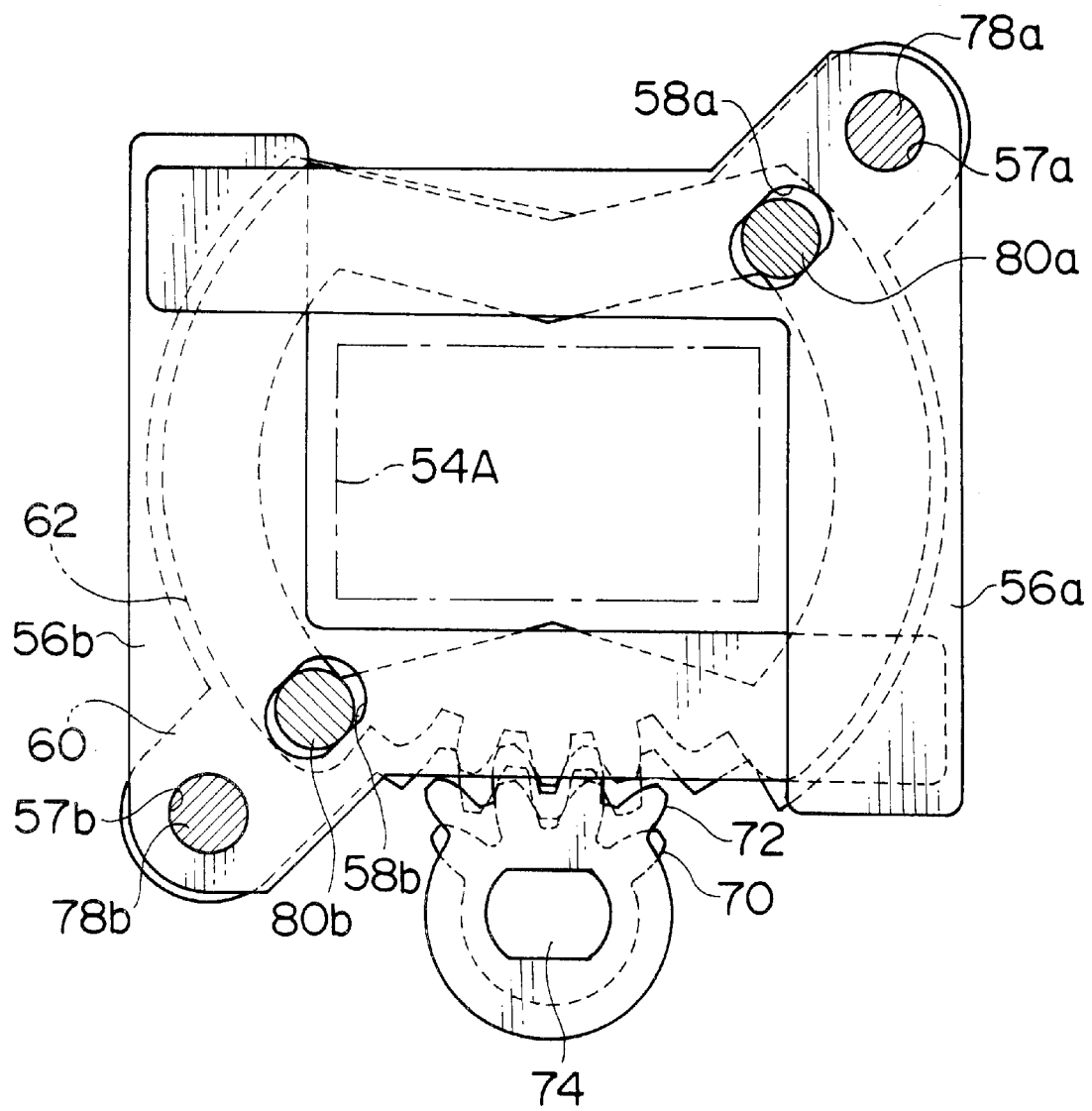

FINDER VISUAL FIELD CHANGING MECHANISM

BACKGROUND OF THE INVENTION

1. Field of the Invention

The present invention relates generally to a finder visual field changing mechanism, and more particularly to a finder visual field changing mechanism which is able to switch a plurality of visual field patterns in accordance with a print aspect ratio which is selected during the photographing.

2. Description of Related Art

A conventional optical finder, which is incorporated in a camera, is constructed in such a way that an objective lens, a prism and an eyepiece are arranged in a finder unit body frame. A subject light passing through the objective lens is bent by the prism, and is led to the eyepiece so that the subject image can be observed through the eyepiece.

A visual field frame is arranged on a light path of the finder optical system, and it determines a visual field. Japanese Patent Provisional Publication No. 6-82882 discloses a visual field changing frame comprising a pair of L-shaped visual field frame pieces, which are movable and arranged symmetrically, and a visual field changing mechanism, which is able to gradually or step-by-step change the visual field according to print aspect ratios (PAR) by moving the visual field frame pieces. For instance, one of a conventional (C) aspect ratio, a high-vision (H) aspect ratio and a panoramic (P) aspect ratio is selected during the photographing, and the visual field is changed according to the selected PAR.

In the conventional visual field changing frame, the L-shaped visual field frame pieces, which vertically face each other move parallel in substantially a diagonal direction so as to expand and compress the visual field. In such a mechanism, however, the visual field frame pieces have to move over a wide area, and thus, the camera cannot be compact.

SUMMARY OF THE INVENTION

The present invention has been developed in view of the above-described circumstances, and has as its object the provision of a finder visual field changing mechanism in a finder which is able to change the visual field in accordance with the print aspect ratio by moving visual field frame pieces within a narrow area, to make a camera more compact.

To achieve the above-mentioned object, a finder visual field changing mechanism of the present invention for switching a plurality of visual fields of different aspect ratios, comprises: a fixed visual field frame determining a visual field of a first aspect ratio; a movable visual field frame including a pair of substantially L-shaped movable visual field frame pieces arranged to face each other, being provided close to the fixed visual field frame, and being capable of determining visual fields of second and third aspect ratios with the fixed visual field frame; a first driving member rotatably supporting and driving the movable visual field frame pieces, and being capable of rotating about a finder optical axis; a second driving member driving the movable visual field frame pieces with the first driving member, including a regulating part regulating rotation of the movable visual field frame pieces with respect to the first driving member, and being capable of rotating about the finder optical axis by a larger rotational angle than the first driving member, to regulate positions of the movable visual field frame pieces; and is characterized in that the rotational angles of the first and second driving members are controlled so as to switch the visual fields of the first, second and third aspect ratios.

According to the present invention, the movable visual field frame, which is constructed by the pair of substantially L-shaped movable visual field frame pieces facing each other, is arranged in close vicinity to the fixed visual field frame which determines the visual field of the first aspect ratio. The first and second driving members, which drive the movable visual field frame pieces, are provided in such a manner as to rotate about the finder optical axis.

The movable visual field frame pieces are rotatably supported by the first driving member. With the rotation of the first driving member, the movable visual field frame pieces move in a circumferential direction about the finder optical axis, and the relative positions of the movable visual field frame pieces can be changed with respect to the first driving member.

On the other hand, the second driving member rotates by a larger rotational angle than the first driving member, and the second driving member regulates the rotation of the movable visual field frame pieces with respect to the first driving member, thereby correcting the position of the movable visual field frame. In other words, even after the movable visual field frame pieces move with the rotation of the first driving member, the upper and lower sides of the movable visual field frame can be horizontal (the right and left sides can be vertical).

Hence, the length and width of an operating area (a moving area) of the movable visual field frame pieces is smaller than the length and width of an operating area of a conventional mechanism which guides movable visual field frame pieces in substantially the diagonal direction In the present invention, the rotational angles of the first and second driving member are controlled to drive the movable visual field frame pieces in such a direction that the right and left sides of the movable visual field frame can become closer to one another, thereby shielding the right and left parts of the opening area of the fixed visual field frame. The visual field of the second aspect ratio, which is narrower in the width than the visual field of the first aspect ratio, is determined by the right and left sides of the movable visual field frame and the upper and lower sides of the fixed visual field frame. On the other hand, the rotational angles of the first and second driving member are controlled to drive the movable visual frame pieces in such a direction that the upper and lower sides of the movable visual field frame can become closer to one another, thereby shielding the upper and lower parts of the opening area of the fixed visual field frame. The visual field of the third aspect ratio, which is narrower in the length than the visual field of the first aspect ratio, is determined by the upper and lower sides of the movable visual field frame and the right and left sides of the fixed visual field frame. Thus, the visual field can be changed to three patterns.

Moreover, first and second driving gears, which respectively drive the first and second driving members, are provided on a common driving shaft, and a rotational ratio of the first driving gear to the first driving member is set different from a rotational ratio of the second driving gear to the second driving member. Hence, the first and second driving members can be rotated by different rotational angles, and thereby, it is possible to control the positions of the movable visual field frame pieces.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 1 is a perspective view illustrating the appearance of a camera to which a finder visual field changing mechanism of the present invention is applied;

FIG. 6 is a view of assistance in explaining the case where a high-vision visual field is determined;

DETAILED DESCRIPTION OF THE PREFERRED EMBODIMENT

Figure 2:
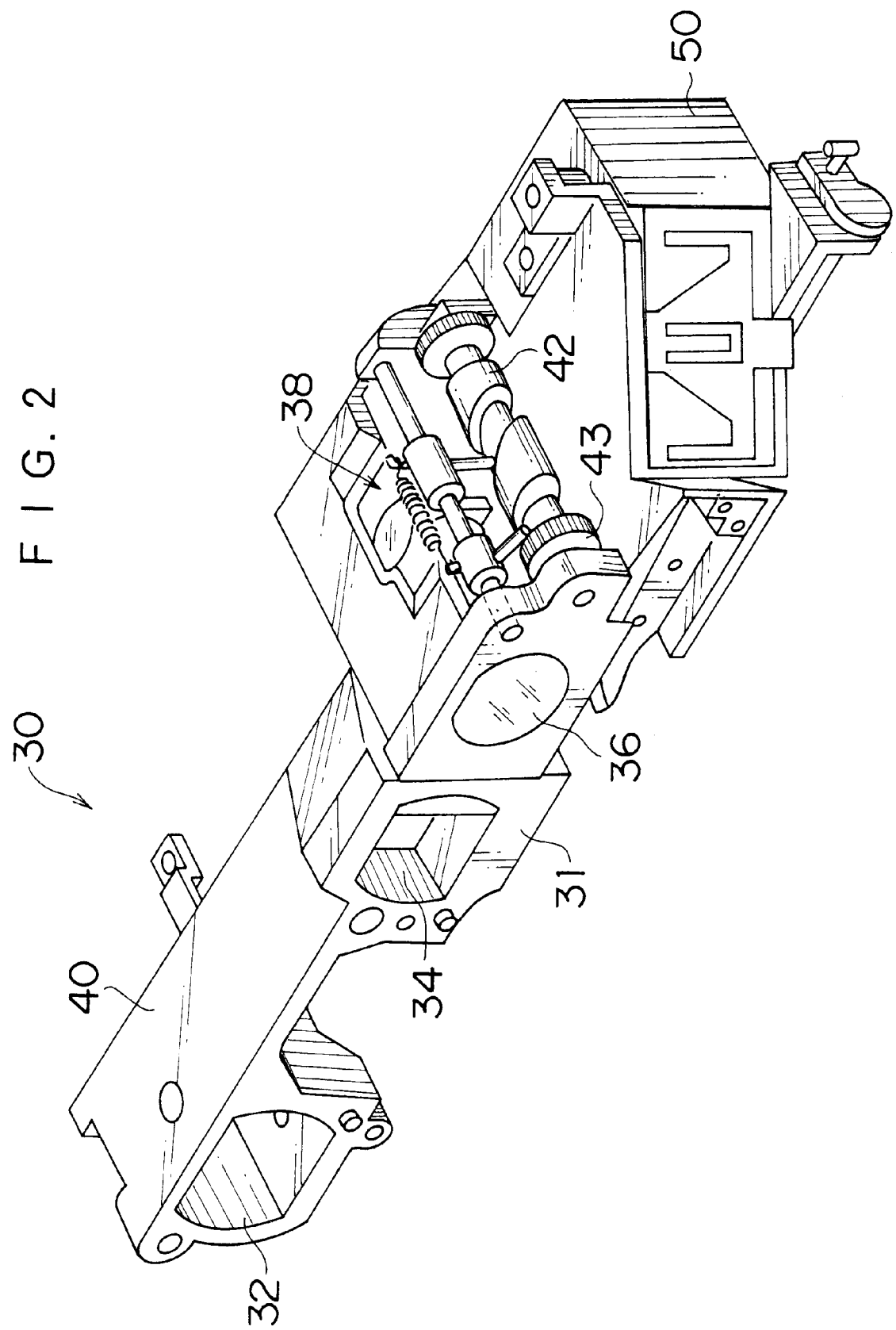
FIG. 2 is a perspective view illustrating a finder unit which is incorporated in the camera in FIG. 1.

This invention will be described in further detail by way of example with reference to the accompanying drawings.

FIG. 1 is a perspective view illustrating the appearance of a camera to which a finder visual field changing mechanism of the present invention is applied. A lens barrel 13, which includes a taking lens 12, is provided at the center of the front face of the camera 10. A strobe window 14 is formed at the upper right corner of the camera 10. A finder objective window 16, an AF light projector window 18, a photometry window 20, and an AF light acceptor window 22 are formed in order at the left of the strobe window 14. A shutter release button 24 is provided at the top of the camera 10.

An AF light projector is provided at the interior of the AF light projector window 18, and an AF light acceptor is provided at the interior of the AF light acceptor window 22. The light projector and the light acceptor construct an auto-focusing (AF) part which measures the distance to a subject. The AF part measures the subject distance based on, for example, the principle of triangulation, and the measurement results are used to control the auto-focusing.

A lens (not shown), through which the external light enters, and a photometry part, which is composed of a light accepting element provided at an image forming position of the lens, are provided at the interior of the photometry window 20. The photometry part measures the brightness of the external light within the photographic visual field. The measurement results are used to control the auto-exposure (AE).

The taking lens 12 is composed of an optical system, which differs conformable to a type of the camera: for example, a double zoom which is able to change the focal length within a range of f=25–55 mm, and a triple zoom which is able to change the focal length within a range of f=30–90 mm. A zoom button (not shown) is provided at the back of the camera 10.

When the zoom button is manipulated, a lens driving motor (not shown) is driven, and the driving force of the motor is transmitted to a driving mechanism of the taking lens 12 and a driving mechanism of a movable lens system of a zoom finder via gear trains. A user can select a desired photographic magnification by manipulating the zoom button, and can observe a visual field which is substantially equal to a photographic angle of view through an eyepiece of the finder.

A shutter (not shown) is arranged on the optical axis of the taking lens 12 in the camera 10, and the shutter is released with the shutter release button 24.

FIG. 2 is a perspective view illustrating a finder unit 30, which is incorporated in the camera 10. An AF light acceptor housing part 32 meeting the AF light acceptor window 22 and an AF light projector housing part 34 meeting the AF light projector window 18 are formed in a body frame 31 of the finder unit 30, and an objective lens 36 is arranged behind the finder objective window 16.

Figure 3:
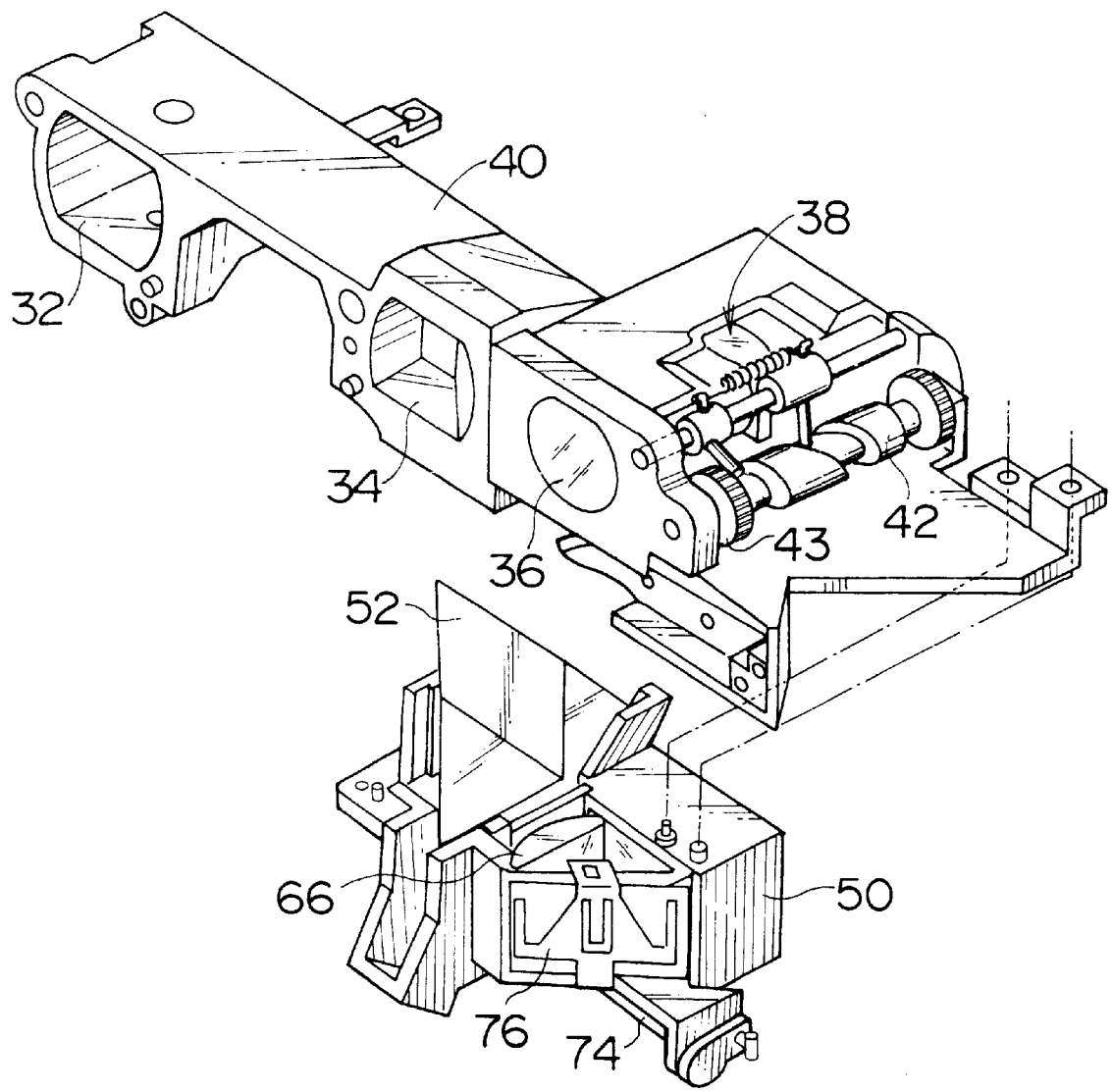
FIG. 3 is a perspective view illustrating the construction of the finder unit in FIG. 2.

As shown in FIG. 3, the body frame 31 of the finder unit 30 is composed of two blocks: a first housing frame 40 and a second housing frame 50. The AF part (the AF light acceptor and the AF light projector), the objective lens 36, a variable magnification optical system 38 and a driving mechanism for the variable magnification optical system, etc. are housed in the first housing frame 40. On the other hand, a prism 52, a visual field frame which will be described later, the eyepiece, etc. are housed in the second housing frame 50.

Although not illustrated in detail, the variable magnification optical system, which is arranged behind the objective lens 36, is composed of two movable lens groups, and an optical position of each movable lens group is regulated by a cam face which is formed on the peripheral surface of a cam shaft 42 supported by the first housing frame 40.

A gear 43 is secured to the front end of the cam shaft 42, and the gear 43 is connected to the driving motor (the zoom motor) of the taking lens barrel 13 via a gear train (not shown). Hence, the cam shaft 42 rotates in connection with the zooming operation, so that the photographic angle of view can correspond to the range of the finder visual field.

Figure 4:
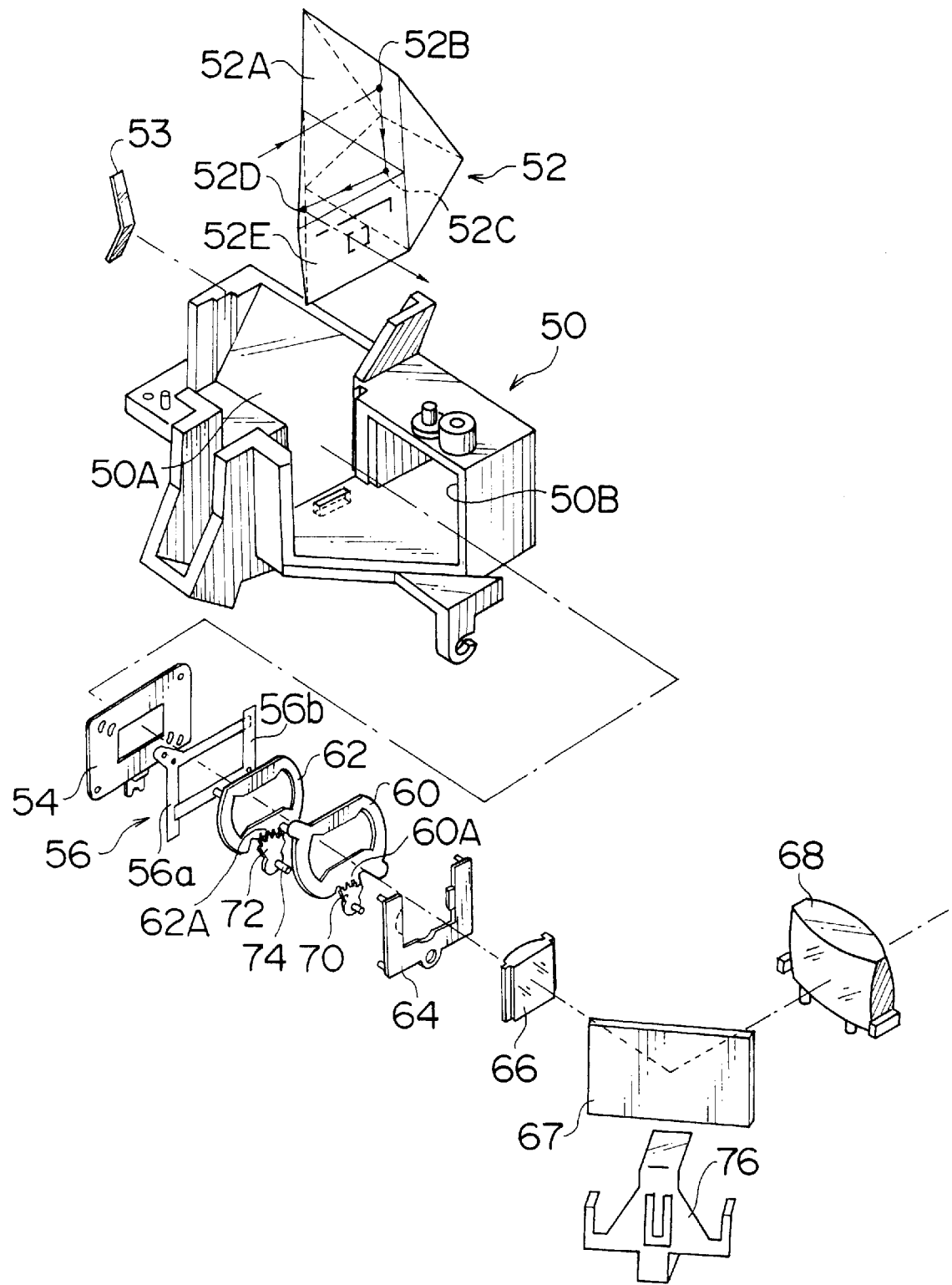
FIG. 4 is an exploded perspective view partially illustrating an optical system of the finder unit in FIG. 3.

FIG. 4 is an exploded perspective view illustrating the construction of the finder optical system which is housed in the second housing frame 50. The second housing frame 50 houses the prism 52, a high-vision (H) visual field frame 54 (equivalent to a fixed visual field frame), a conventional/panoramic (CP) visual field frame 56 (equivalent to a movable visual field frame), a first driving member 60 which rotates movable visual field frame pieces of the CP visual field frame 56, a second driving member 62 which regulates the positions of the movable visual field frame pieces, a visual field frame base 64, a field lens 66, a mirror 67, the eyepiece 68, etc.

The prism 52 is received in the second housing frame 50 along a slope 50A, which is formed at the top of the second housing frame 50. A prism pressing plate 53 presses the prism 52 to the right in FIG. 4 from the side, so that the prism 52 can be steadily positioned in the second housing frame 50.

The prism 52 is composed of two right-angled prisms, and it reflects the incident subject light three times so as to obtain an erect image. Specifically, the subject light passes through the objective lens 36 and the variable magnification optical system 38, and it enters the prism 52 via an incident plane 52A. Then, the subject light is reflected downward by a right angle on a reflection plane 52B, and it is reflected forward by a right angle on the reflection plane 52C. Further, the subject light is reflected horizontally (laterally) by a right angle on a reflection plane 52D, and it exits the prism 52 via an exit plane 52E, which is perpendicular to the incident plane 52A. An image of the subject is formed on the exit plane 52E, on which a target mark and a parallax compensation mark are inscribed.

The H visual field frame 54, which is arranged close to the exit plane 52E of the prism 52, is the fixed visual field frame which is provided with an opening for determining a visual field in the angle of view corresponding to the high-vision (H) aspect ratio (the first aspect ratio) of the PAR. The H visual field frame 54 has an opening area (a light passing area) which is larger than openings of the conventional (C) aspect ratio (the second aspect ratio) and the panoramic (P) aspect ratio (the third aspect ratio), which will be described later.

The CP visual field frame 56 is arranged close to the H visual field frame 54, and the CP visual field frame 56 is able to switch and determine the visual fields of the C and P aspect ratios. The CP visual field frame 56 is constructed by a pair of substantially L-shaped movable visual field frame pieces 56a, 56b which are vertically combined. The CP visual field frame 56 determines the visual field of the C or P aspect ratio with the H visual field frame 54 by moving the visual field frame pieces 56a, 56b in such a direction that the right and left sides or the upper and lower sides of the visual field frame pieces 56a, 56b can become closer to one another or become farther away from one another.

In other words, the openings of the C and P aspect ratios can be formed by partially narrowing the opening of the H aspect ratio. For this reason, the opening 54A of the H visual field frame 54 is utilized, and the pair of movable visual field frame pieces 56a, 56b are vertically combined and moved by an appropriate amount, so that the visual field can be changed according to the H, C or P aspect ratio.

An arc guide groove, which guides the rotation of the first and second driving members 60, 62, is formed on the front face of the visual field frame base 64, and the first and second driving members 60, 62 are supported by the visual field frame base 64 in such a manner as to rotate about the finder optical axis.

A gear 60A whose number of teeth is $x_1$ (when "the number of teeth" of a gear is mentioned hereinafter, it is supposed that the teeth are formed on the whole circumference of the base circle of the gear) is formed at the lower part of the first driving member 60, and the gear 60A is engaged with a driving gear 70 whose number of teeth is $z_1$. A gear 62A whose number of teeth is $x_2$ is formed at the lower part of the second driving member 62, and the gear 62A is engaged with a driving gear 72 whose number of teeth is $z_2$. The driving gears 70, 72 are provided on a common driving shaft 74 (see FIG. 5).

The driving shaft 74 is driven to rotate the first and second driving members 60, 62, thereby moving the movable visual field frame pieces 56a, 56b. This visual field changing mechanism will later be described in further detail.

The field lens 66 is fixed behind the visual field frame base 64, and the mirror 67 is fixed behind the field lens 66. The mirror 67 is mounted at the edge of the second housing frame 50 at an angle of 45° with respect to an exit plane of the field lens 66. The mirror pressing plate 76 presses the mirror 67 from behind, so that the mirror 67 can be fixed to the second housing frame 70. The subject light which exits the exit plane 52E of the prism 52 is reflected by a right angle on the mirror 67 toward the back of the camera 10, and the subject light reaches the eyepiece 68.

The eyepiece 68 is mounted in an opening 50B, which is formed in the second housing frame 50, via a diopter adjusting cam (not shown) in such a manner as to move forward and backward. The diopter adjusting cam connects to a diopter adjustment control (not shown), and the user can adjust the diopter by manipulating the diopter control to move the eyepiece 68 forward and backward.

A description will now be given of the visual field changing mechanism.

Figure 5:
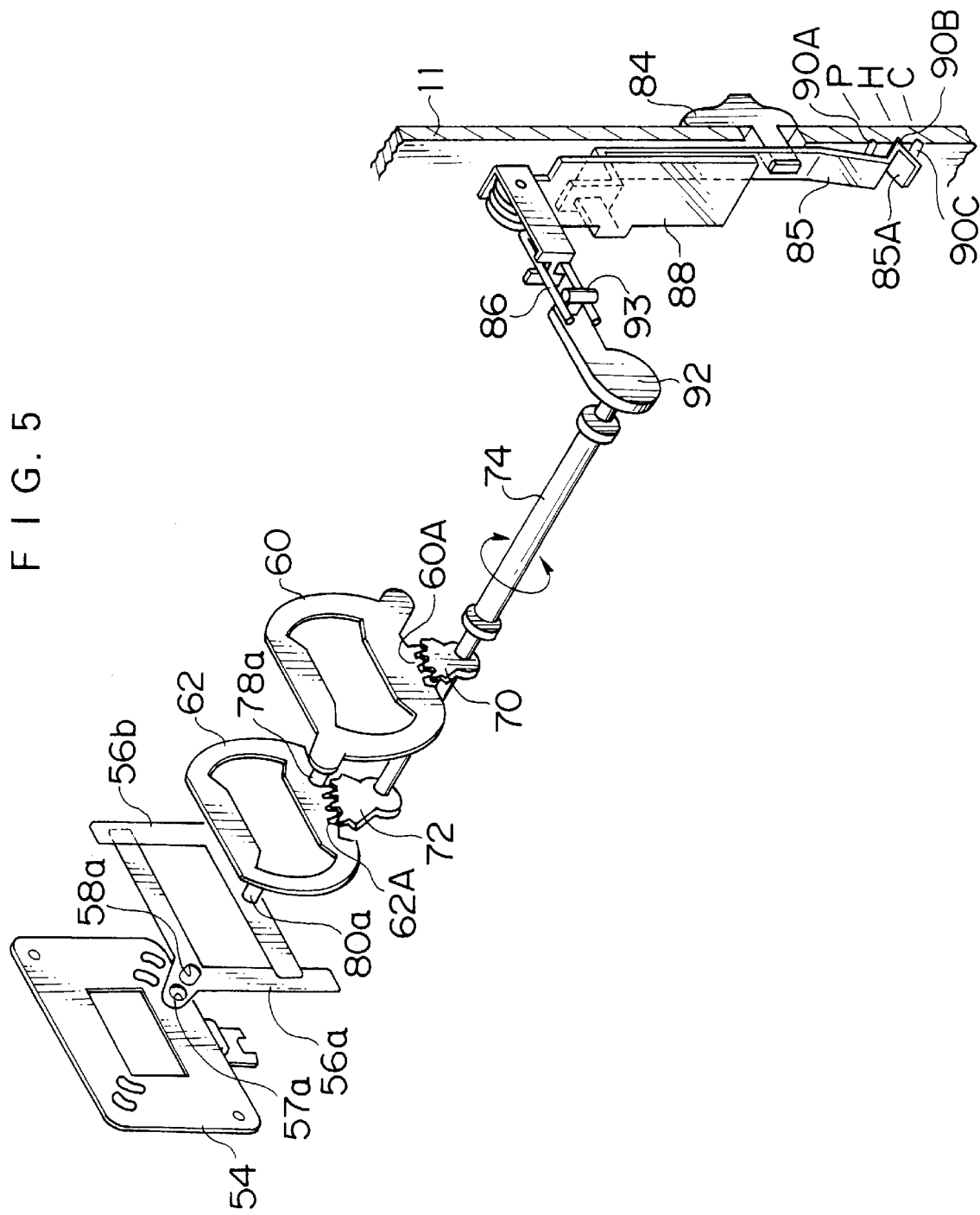
FIG. 5 is a perspective view illustrating the structure of the finder visual field changing mechanism.

FIG. 5 is a perspective view illustrating the structure of the visible field changing mechanism. As stated previously, the movable visual field frame 56, which is constructed by the pair of movable visual field frame pieces 56a, 56b, is arranged behind the H visual field frame 54. A circular aperture 57a and a slit 58a are formed in vicinity to the corner of the movable visual field frame piece 56a. A pin 78a, which is provided at the first driving member 60, engages with the circular aperture 57a. The movable visual field frame piece 56a is rotatably supported by the pin 78a. A pin 80a, which is provided at the second driving member 62, is loosely inserted in the slit 58a.

Likewise, a circular aperture 57b and a slit 58b (shown in FIG. 6) are formed in vicinity to the corner of the movable visual field frame piece 56b. A pin 78b of the first driving member 60 engages with the circular aperture 57b. The movable visual field frame piece 56b is rotatably supported by the pin 78b. A pin 80b of the second driving member 62 is loosely inserted in the slit 58b (see FIG. 6).

The visual field changing mechanism is provided with a mechanism which transmits a driving force for rotating the first and second driving members 60, 62. Specifically, the visual field changing mechanism is provided with: a switching control 84, which is provided on a back cover 11 of the camera 10 in such a manner as to slide vertically; a PAR armature 85, which connects to the switching control 84 and vertically moves in association with the switching control 84; and a CHP lever 88, which connects to the PAR armature 85 and is provided with a spring (an elastic member) 86 for transmitting the vertical movement of the PAR armature 85 to the driving shaft 74.

Click grooves 90A, 90B, 90C are formed at the interior of the back cover 11 of the camera 10, and they control a position where the PAR armature 85 stops. The click grooves 90A, 90B, 90C are used to set the C, H and P visual fields, respectively, from the bottom in FIG. 5. A nail 85A is bent to be formed at the PAR armature 85, and the nail 85A engages with one of the click grooves 90A, 90B, 90C. If the switching control 84 is manipulated to engage the nail 85A of the PAR armature 85 with one of the click grooves 90A, 90B, 90C, the visual field can be switched to the one of the C, H and P visual fields.

A shaft rotating lever 92 is provided at one end of the driving shaft 74, and a T-shaped spring hook 93 is formed at the end of the shaft rotating lever 92. The spring 86 is coupled to the spring hook 93, and the driving shaft 74 is connected to the CHP lever 88 via the spring 86.

Thus, the PAR armature 85 and the CHP lever 88 vertically move in accordance with the manipulation of the switching control 84. Then, the movement of the CHP lever 88 is transmitted to the driving shaft 74 via the spring 86.

As stated previously, the driving gears 70, 72 are provided at the other end of the driving shaft 74, and the driving gears 70, 72 engages with the gears 60A, 62A, respectively, of the first and second driving members 60, 62.

The number of teeth of the gear 60A of the first driving member 60 is $x_1$, the number of teeth of the driving gear 70 is $z_1$, the number of teeth of the gear 62A of the second driving member 62 is $x_2$, and the number of teeth of the driving gear 72 is $z_2$. The following equation (1) is obtained in accordance with the relations between a gear ratio of the driving gear 70 to the gear 60A, a gear ratio of the driving gear 72 to the gear 62A, and a ratio of the rotational angle $\theta_1$ of the first driving member 60 to the rotational angle $\theta_2$ of the second driving member 62:

$$\theta_1 : \theta_2 = (z_1/x_1) : (z_2/x_2). \tag{1}$$

Moreover, since the distance between the axis of the driving gear 70 and the center of rotation of the first driving member 60 is equal to the distance between the axis of the driving gear 72 and the center of rotation of the second driving member 62, the following equation (2) is obtained:

$$x_1 - x_2 = z_2 - z_1. \tag{2}$$

A combination of $\theta_1$, $\theta_2$, $z_1$, $z_2$, $x_1$ and $x_2$ which satisfies the above-mentioned equations is selected.

Two gear mechanisms of different gear ratios, which are driven by the common driving shaft 74, are adopted to rotate the first driving member 60 at $\theta_1$ about the finder optical axis and to rotate the second driving member 62 at $\theta_2$ (>$\theta_1$) in the same direction about the finder optical axis. Specifically, when the driving shaft 74 rotates at a predetermined angle ($\phi$), the second driving member 62 rotates by a larger rotational angle than the first driving member 60 due to the difference in the gear ratio (see FIG. 7).

Due to the difference in the rotational angle, it is possible to regulate the rotation of the movable visual field frame pieces 56a, 56b with respect to the first driving member 60, and correct their positions so that their upper and lower sides can be horizontal (the right and left sides can be vertical).

The differences in the rotational angle are separately predetermined in accordance with a variety of conditions such as the arrangement of the circular apertures 57a, 57b and the slits 58a, 58b of the movable visual field frames 56a, 56b, and the distance between the pins 78a, 78b of the first driving member 60.

Figure 7:
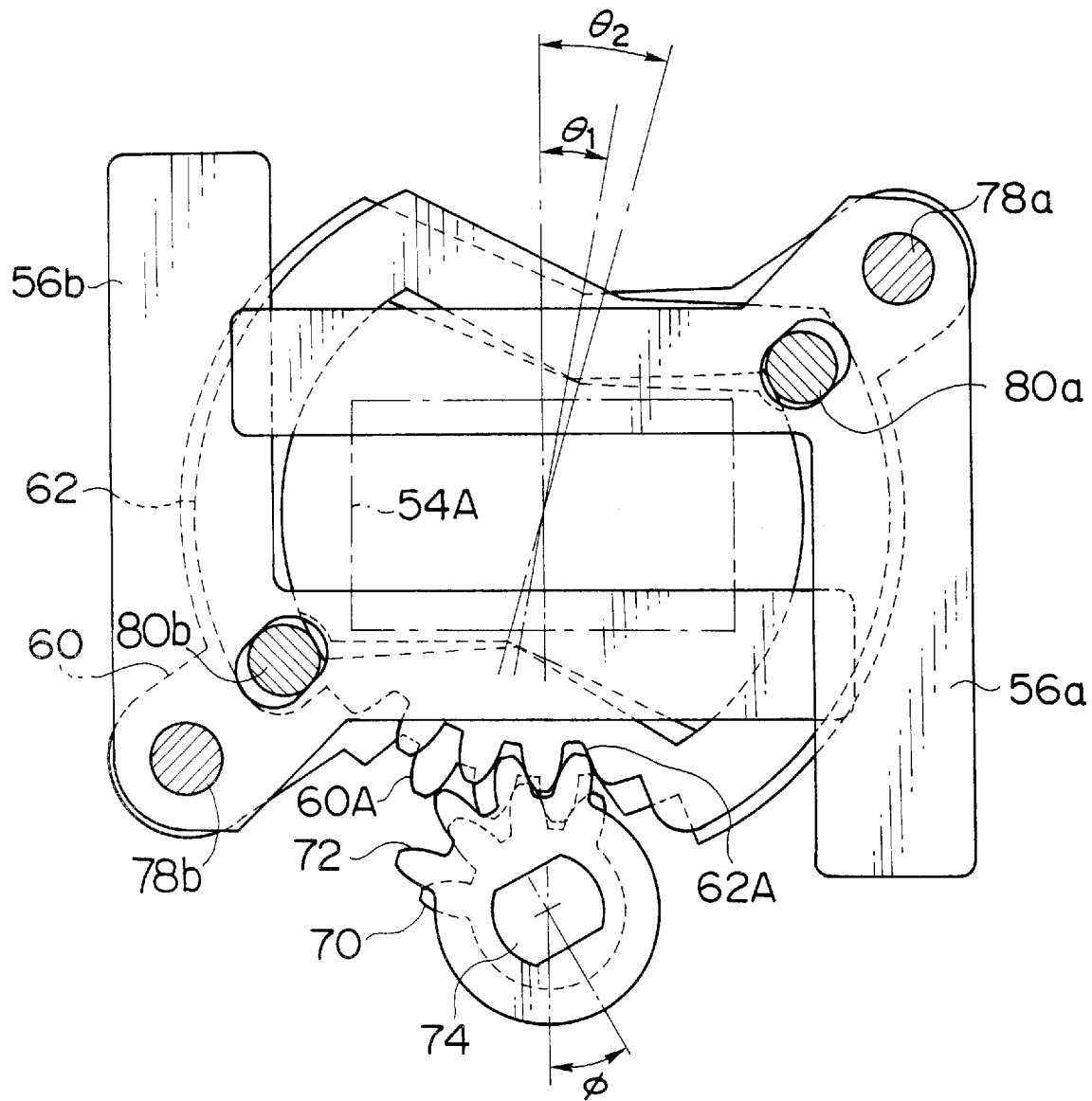
FIG. 7 is a view of assistance in explaining the case where a panoramic visual field is determined.
Figure 8:
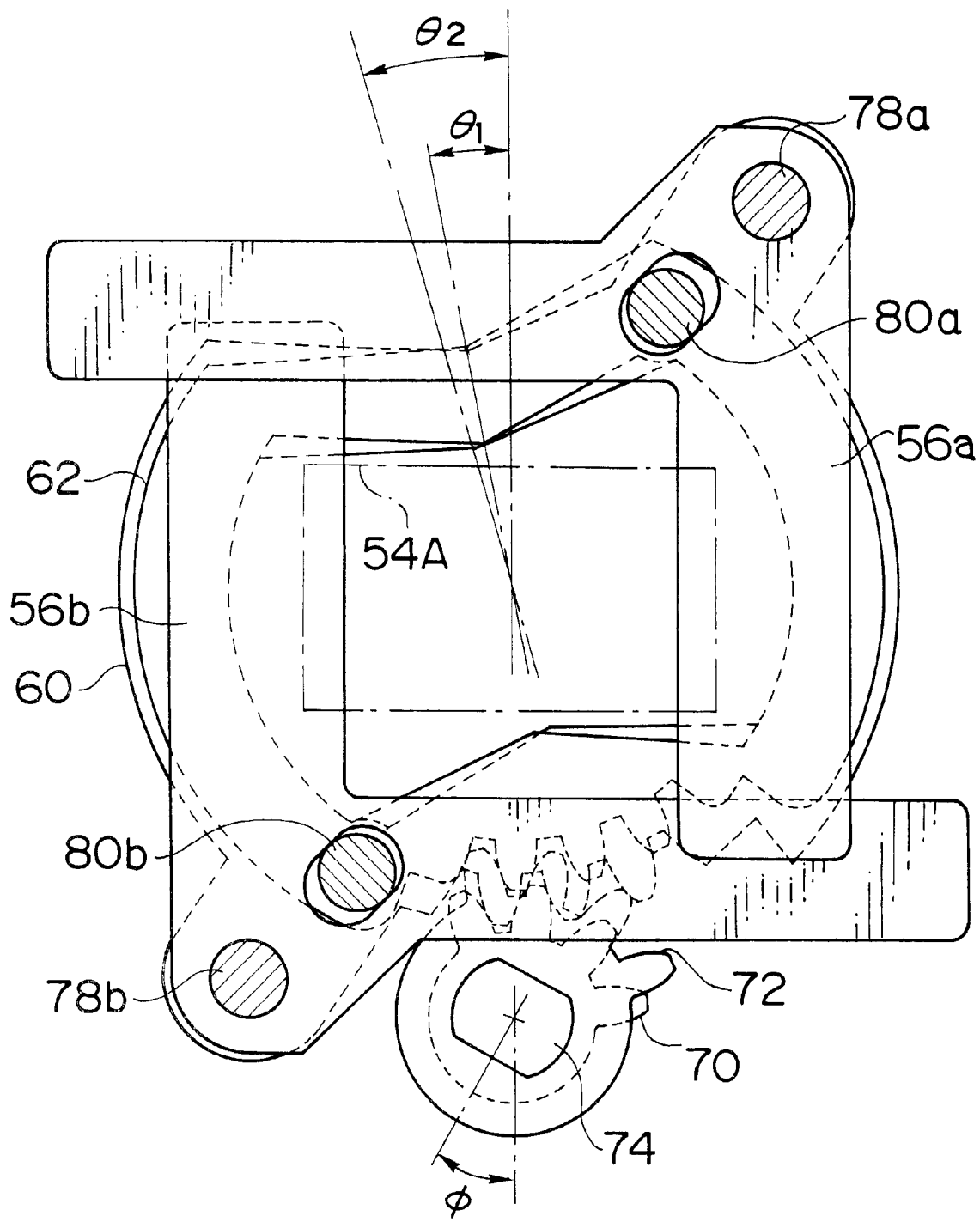
FIG. 8 is a view of assistance in explaining the case where a conventional visual field is determined.

A description will be given of the operation of the finder visual field changing mechanism which is constructed in the above-mentioned manner. FIGS. 6, 7 and 8 are front views illustrating the case where the visual fields are switched according to the high-vision, panoramic and conventional angles of view. Each view is taken from the light incident side (from the prism 52).

In the examples shown in FIGS. 6, 7 and 8, the distance between the pins 78a, 78b of the first driving member 60 is 26.4 mm, and the distance between the pins 80a, 80b of the second driving member 62 is 16.8 mm. In order to determine a panoramic angle of view (27.4:9.6) and a conventional angle of view (22.3:15.6) by using the opening 54A of a high-vision angle of view (27.4:15.6) in the H visual field frame 54, the rotational angle $\theta_1$ of 10.8° and the rotational angle $\theta_2$ of 15.84° are adopted as a result of construction. Under the above-mentioned conditions, the number of teeth $x_1$ of the gear 60A of the first driving member 60 is 27, the number of teeth $x_2$ of the gear 62A of the second driving member 62 is 24, the number of teeth $z_1$ of the driving gear 70 is 10, and the number of teeth $z_2$ of the driving gear 72 is 13.

If the user sets the switching control 84 in FIG. 5 to H, the PAR armature 85 engages with the click groove 90B, and the CHP lever 88 is held at substantially the center of its movable area. In this case, the spring 86 does not apply any force to the driving shaft 74, and the driving gears 70, 72 do not rotate. As shown in FIG. 6, the rotational angles of the first and second driving members 60, 62 are 0°, and the movable visual field frame pieces 56a, 56b of the C visual field frame 56 determine a larger quadrilateral than the opening 54A of the H visual field frame 54. Thus, the visual field is determined by the opening 54A of the high-vision (H) aspect ratio in the H visual field frame 54.

When the switching control 84 is manipulated from H to P, the PAR armature 85 moves upward in FIG. 5, and engages with the click groove 90A to push up the CHP lever 88. Accordingly, the driving shaft 74 is rotated with the spring 86. With the rotation of the driving shaft 74, the driving gears 70, 72 rotate counterclockwise as shown in FIG. 7. Thereby, the first and second driving members 60, 62 rotate clockwise in FIG. 7. Specifically, the driving gears 70, 72 rotate by $\phi$=29.2°, the first driving member 60 rotates by $\theta_1$=10.8°, and the second driving member 62 rotates by $\theta_2$=18.4°.

When the first driving member 60 rotates clockwise by $\theta_1$, the movable visual field frame piece 56a, which is coupled to the first driving member 60, moves clockwise to the lower right from the position indicated in FIG. 6. The movable visual field frame piece 56b, which is coupled to the first driving member 60, moves clockwise to the upper left from the position indicated in FIG. 6. Consequently, the upper and lower sides of the movable visual field frame pieces 56a, 56b move in a direction to become closer to one another.

If there is no second driving member 62, the upper and lower sides of the movable visual field frame pieces 56a, 56b could not be horizontal. In this embodiment, the second driving member 62 rotates by a larger rotational angle than the first driving member 60 does. Thus, the pins 80a, 80b, which engage with the slits 58a, 58b, can regulate the positions of the movable visual field frame pieces 56a, 56b. The movable visual field frame pieces 56a, 56b, which are rotatably supported by the pins 78a, 78b engaging the circular apertures 57a, 57b, rotate relatively to the first driving member 60, so that the upper and lower sides of the movable visual field frame pieces 56a, 56b can be horizontal.

The upper and lower sides of the movable visual field frame pieces 56a, 56b, however, do not have to be kept horizontal during the movement. The upper and lower sides of the movable visual field frame pieces 56a, 56b must be horizontal only when the determination of the visual field of the panoramic aspect ratio is completed.

With the above-described operation, the length of the opening is made shorter than that of the opening 54A of the H visual field frame 54, and thus, the panoramic (P) visual field is determined.

If the switching control 84 in FIG. 5 is positioned at C, the PAR armature 85 moves downward in FIG. 5 to engage with the click groove 90C, thereby pushing the CHP lever 88 downward. Accordingly, the driving shaft 74 is rotated with the spring 86. With the rotation of the driving shaft 74, the driving gears 70, 72 rotate clockwise as shown in FIG. 8, and the first and second driving members 60, 62 rotate counterclockwise.

When the first driving member 60 rotates counterclockwise by $\theta_1$, the movable visual field frame piece 56a, which is coupled to the first driving member 60, moves counterclockwise to the upper left from the position indicated in FIG. 6. The movable visual field frame piece 56b, which is coupled to the first driving member 60, moves counterclockwise to the lower right from the position indicated in FIG. 6.

Consequently, the right and left sides of the movable visual field frame pieces 56a, 56b move in a direction to become closer to one another. The second driving member 62 rotates by a larger rotational angle than the first driving member 60 does. Thus, the pins 80a, 80b, which engage with the slits 58a, 58b, can regulate the positions of the movable visual field frame pieces 56a, 56b. The movable visual field frame pieces 56a, 56b, which are rotatably supported by the pins 78a, 78b engaging the circular apertures 57a, 57b, rotate relatively to the first driving member 60, so that the upper and lower sides of the movable visual field frame pieces 56a, 56b can be horizontal.

With the above-described operation, the width of the opening is made shorter than that of the opening 54A of the H visual field frame 54, and thus, the conventional (C) visual field is determined.

In this embodiment, the length and width of the operating area (the moving area) of the movable visual field frame pieces are smaller than the length and width of the operating area of a conventional mechanism which guides the movable visual field frame pieces in substantially the diagonal direction.

As set forth hereinabove, according to the finder visual field changing mechanism of the present invention, a pair of the movable visual field frame pieces are driven by the first and second driving members, which are supported in such a manner as to rotate about the finder optical axis. The second driving member rotates by a larger rotational angle than the first driving member does, and the positions of the movable visual field frame pieces are regulated by means of the difference in the rotational angle. For this reason, the operating area of the movable visual field frame pieces can be smaller than that of a conventional mechanism which guides the movable visual field frame pieces in substantially the diagonal direction Hence, it is possible to save a space for the visual field frame of the finder and make the camera more compact.

It should be understood, however, that there is no intention to limit the invention to the specific forms disclosed, but on the contrary, the invention is to cover all modifications, alternate constructions and equivalents falling within the spirit and scope of the invention as expressed in the appended claims.

I claim:

1. A finder visual field changing mechanism for switching a plurality of visual fields of different aspect ratios, comprising:

a fixed visual field frame determining a visual field of a first aspect ratio;

a movable visual field frame including a pair of substantially L-shaped movable visual field frame pieces arranged to face each other, being provided close to said fixed visual field frame, and being capable of determining visual fields of second and third aspect ratios with said fixed visual field frame;

a first driving member rotatably supporting and driving said movable visual field frame pieces, and being capable of rotating about a finder optical axis;

a second driving member driving said movable visual field frame pieces with said first driving member, including a regulating part regulating rotation of said movable visual field frame pieces with respect to said first driving member, and being capable of rotating about the finder optical axis by a larger rotational angle than said first driving member, to regulate positions of said movable visual field frame pieces; and wherein the rotational angles of said first and second driving members are controlled so as to switch the visual fields of the first, second and third aspect ratios.

2. The finder visual field changing mechanism as defined in claim 1, wherein:

right and left sides of said movable visual field frame and upper and lower sides of said fixed visual field frame determine the visual field of the second aspect ratio, when the rotational angles of said first and second driving members are controlled to drive said movable visual field frame pieces in such a direction that said right and left sides of said movable visual field frame become closer to one another; and upper and lower sides of said movable visual field frame and right and left sides of said fixed visual field frame determine the visual field of the third aspect ratio, when the rotational angles of said first and second driving members are controlled to drive said movable visual field frame pieces in such a direction that said upper and lower sides of said movable visual field frame become closer to one another.

3. The finder visual field changing mechanism as defined in claim 2, wherein:

the right and left sides of said movable visual field frame are parallel to one other, when the visual field of the second aspect ratio is determined; and the upper and lower sides of said movable visual field frame are parallel to one other, when the visual field of the third aspect ratio is determined.

4. The finder visual field changing mechanism as defined in claim 1, further comprising:

first and second driving gears respectively driving said first and second driving members, and being provided on a common driving shaft; and wherein the rotational angles of said first and second driving members are controlled by means of difference between a rotational ratio of said first driving gear to said first driving member and a rotational ratio of said second driving gear to said second driving member.

* * * * *